(12) United States Patent
Ichinose et al.

(10) Patent No.: US 10,946,475 B2
(45) Date of Patent: Mar. 16, 2021

(54) TOOL FOR ULTRASONIC BONDING AND APPARATUS FOR ULTRASONIC BONDING

(71) Applicant: TOSHIBA MITSUBISHI-ELECTRIC INDUSTRIAL SYSTEMS CORPORATION, Chuo-ku (JP)

(72) Inventors: Akihiro Ichinose, Tokyo (JP); Yoshihito Yamada, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 115 days.

(21) Appl. No.: 16/321,275

(22) PCT Filed: Aug. 4, 2016

(86) PCT No.: PCT/JP2016/072886
§ 371 (c)(1),
(2) Date: Jan. 28, 2019

(87) PCT Pub. No.: WO2018/025362
PCT Pub. Date: Feb. 8, 2018

(65) Prior Publication Data
US 2019/0160587 A1    May 30, 2019

(51) Int. Cl.
*B23K 20/10* (2006.01)
*B23K 20/02* (2006.01)
(Continued)

(52) U.S. Cl.
CPC ............ *B23K 20/103* (2013.01); *B23K 20/02* (2013.01); *B23K 20/10* (2013.01); *B23K 20/106* (2013.01); *B29C 65/08* (2013.01); *H01R 43/0207* (2013.01)

(58) Field of Classification Search
CPC .. B23K 20/103; B23K 20/02; B23K 2103/36; B23K 20/10–106; B23K 1/06; B29C 65/08; H01R 43/0207
(Continued)

(56) References Cited

U.S. PATENT DOCUMENTS

| | | | | |
|---|---|---|---|---|
| 4,430,148 A | * | 2/1984 | Schaefer | ............... B29C 65/086 156/553 |
| 4,767,492 A | * | 8/1988 | Fukusima | ............... B29C 65/08 156/580.2 |

(Continued)

FOREIGN PATENT DOCUMENTS

| | | |
|---|---|---|
| EP | 2 985 806 A1 | 2/2016 |
| JP | 61002532 A * | 1/1986 ............. B29C 66/45 |

(Continued)

OTHER PUBLICATIONS

Notification of Reasons for Refusal issued in Korean Application 10-2019-7002858 dated Jan. 23, 2020.
(Continued)

*Primary Examiner* — Kiley S Stoner
(74) *Attorney, Agent, or Firm* — Xsensus LLP

(57) ABSTRACT

A bonding tool as the tool for ultrasonic bonding includes a plurality of protrusion portions in a protrusion region at a contact tip portion. The plurality of protrusion portions are equally spaced at a longitudinal direction interval in an X direction as the longitudinal direction of the protrusion region, and an X direction outermost protrusion portion positioned outermost in the X direction is disposed separately from a side edge of the protrusion region in the X direction by a longitudinal direction side edge distance. The plurality of protrusion portions are disposed so that a first
(Continued)

disposition condition {0.349≤EX (the longitudinal direction side edge distance/DX (the longitudinal direction interval) ≤0.510} is satisfied.

7 Claims, 12 Drawing Sheets

(51) Int. Cl.
    *B29C 65/08*           (2006.01)
    *H01R 43/02*         (2006.01)

(58) Field of Classification Search
    USPC .................. 228/1.1, 110.1; 156/580.1–580.2
    See application file for complete search history.

(56) References Cited

U.S. PATENT DOCUMENTS

| | | | | |
|---|---|---|---|---|
| 4,776,905 | A * | 10/1988 | Cheung | B29C 66/81433 156/73.5 |
| 6,165,298 | A * | 12/2000 | Samida | B29C 66/83411 156/552 |
| 6,523,732 | B1 * | 2/2003 | Popoola | B23K 20/106 228/1.1 |
| 6,523,734 | B1 * | 2/2003 | Kawai | G06K 19/07718 156/73.1 |
| 7,337,938 | B2 * | 3/2008 | Noro | B23K 20/106 156/580.1 |
| 8,651,163 | B1 * | 2/2014 | Widhalm | B23K 20/106 156/580.2 |
| 2004/0020580 | A1 * | 2/2004 | Oishi | B29C 66/81433 156/73.1 |
| 2006/0065697 | A1 * | 3/2006 | Kobae | H01L 24/81 228/110.1 |
| 2006/0163315 | A1 * | 7/2006 | Delsman | B23K 20/106 228/1.1 |
| 2006/0169388 | A1 * | 8/2006 | Shimizu | B29C 66/21 156/73.1 |
| 2006/0180635 | A1 * | 8/2006 | Lim | B29C 66/80 228/1.1 |
| 2012/0125520 | A1 | 5/2012 | Yoshida et al. | |
| 2016/0043360 | A1 | 2/2016 | Byun et al. | |
| 2017/0018752 | A1 * | 1/2017 | Kim | B23K 20/233 |

FOREIGN PATENT DOCUMENTS

| | | | |
|---|---|---|---|
| JP | 2003154467 A | | 5/2003 |
| JP | 2004-63376 A | | 2/2004 |
| JP | 2005088067 A | | 4/2005 |
| JP | 2005-177812 A | | 7/2005 |
| JP | 2005-254323 A | | 9/2005 |
| JP | 2005-297055 A | | 10/2005 |
| JP | 2006-231402 A | | 9/2006 |
| JP | 2011009261 A | * | 1/2011 |
| JP | 2013-255927 A | | 12/2013 |
| JP | 2016-52670 A | | 4/2016 |
| JP | 2019005776 A | * | 1/2019 ........... B23K 20/106 |
| WO | 2010150350 A1 | | 12/2010 |

OTHER PUBLICATIONS

Japanese Office Action dated Jun. 18, 2019, in Patent Application No. 2018-531043, 6 pages (with unedited computer generated English translation).

International Preliminary Report on Patentability and Written Opinion dated Feb. 14, 2019 in PCT/JP2016/072886 (with English Translation), 14 pages.

Notice of Reasons for Refusal dated Feb. 4, 2020, issued in corresponding Japanese Application No. 2018-531043, with English Translation 6 pages.

International Search Report dated Oct. 4, 2016 in PCT/JP2016/072886 filed Aug. 4, 2016.

Office Action dated Sep. 20, 2017 in corresponding Taiwanese Application No. 105135688, (with partial English language translation).

Chinese Office Action dated Jun. 23, 2020 in Chinese Application No. 201680088324.2.

* cited by examiner

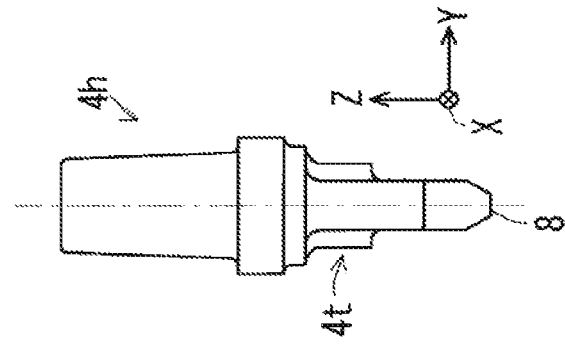
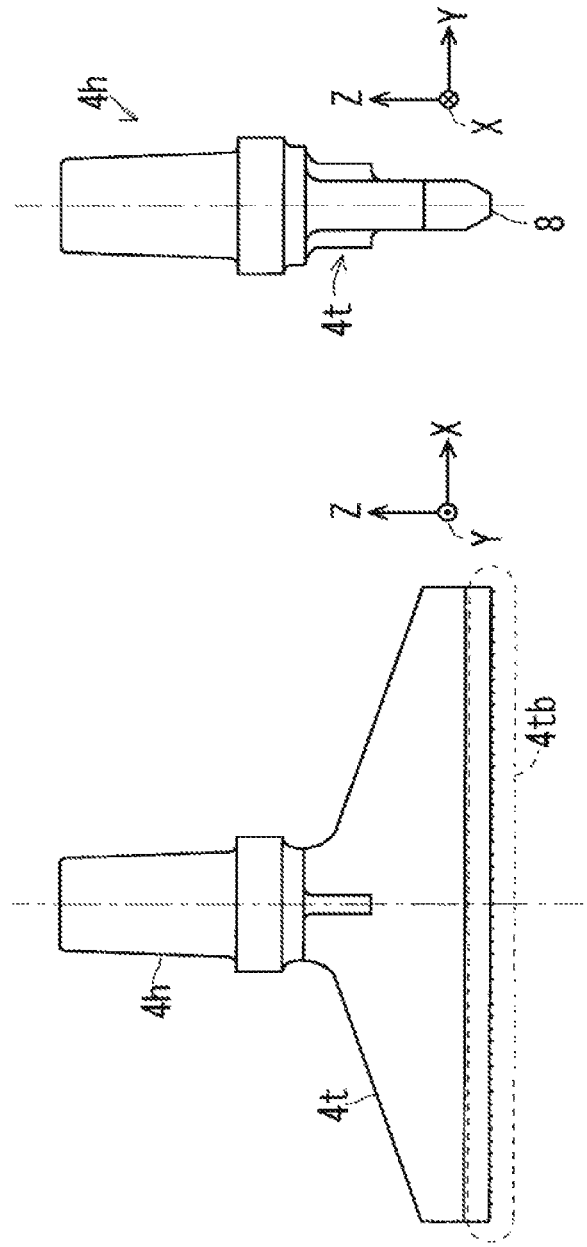
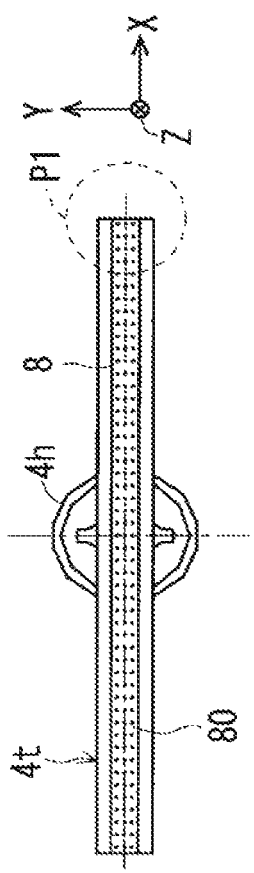

F I G . 1 1
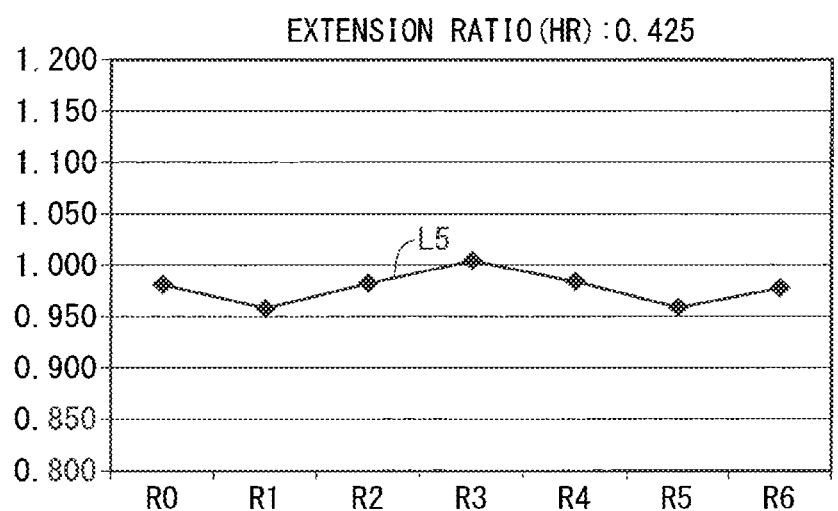
F I G . 1 2
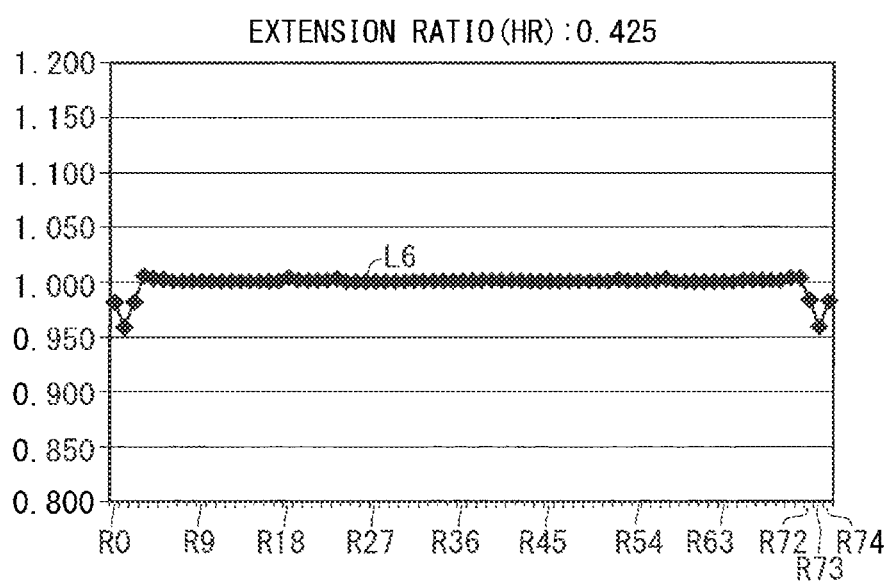

F I G. 1 5
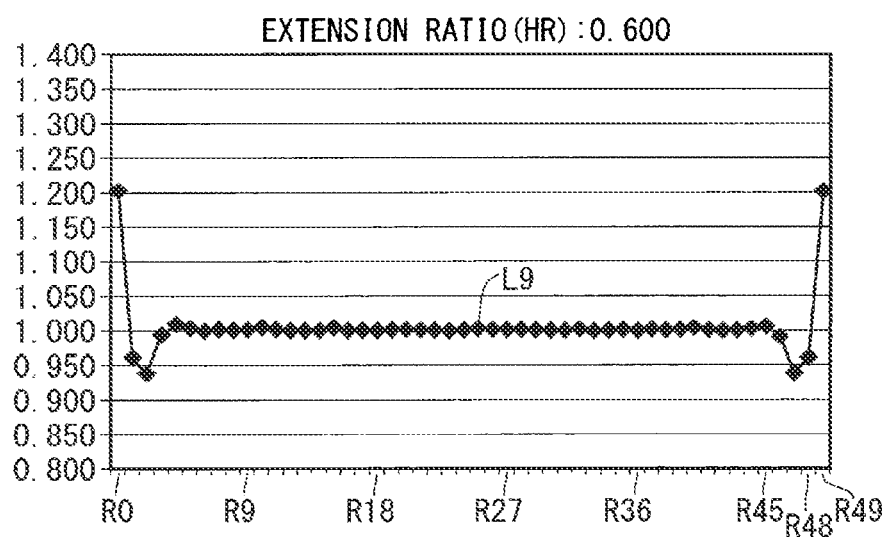
F I G. 1 6
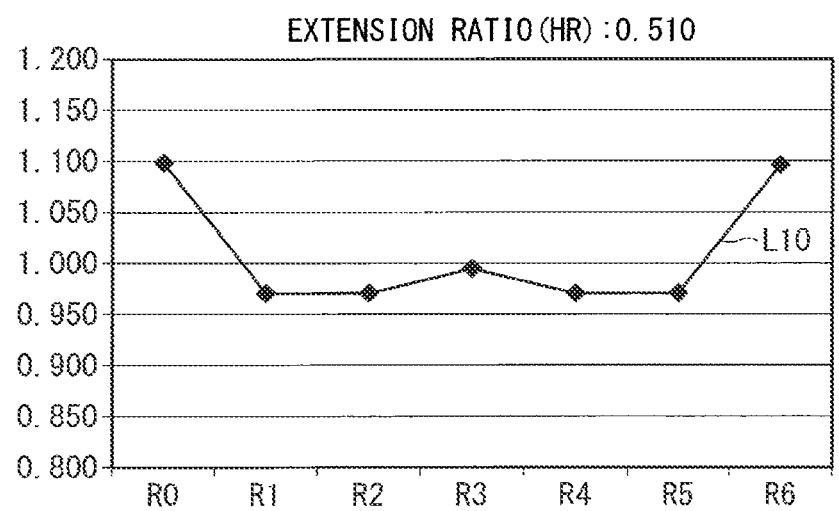

F I G . 1 9
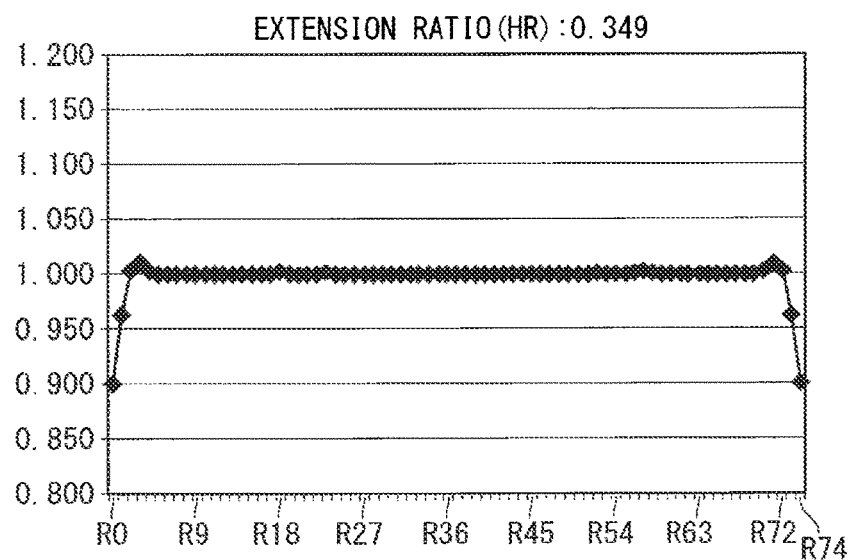
F I G . 2 0
| | DX DIMENSION (mm) | EX DIMENSION (mm) | HR (EXTENSION RATIO) |
|---|---|---|---|
| N=7 | 0.850 | 0.361 | EX/DX=0.425 |
| N=17 | 0.450 | 0.191 | EX/DX=0.425 |
| N=75 | 1.000 | 0.425 | EX/DX=0.425 |

TOOL FOR ULTRASONIC BONDING AND APPARATUS FOR ULTRASONIC BONDING

TECHNICAL FIELD

The present invention relates to a tool for ultrasonic bonding, and particularly relates to a tool for ultrasonic bonding used for an apparatus for ultrasonic bonding configured to bond an electrode wire by utilizing ultrasonic vibration at manufacturing of a solar battery or the like.

BACKGROUND ART

A tool for ultrasonic bonding is a tip metal member configured to pressurize (heat as needed) a workpiece as a bonding target material and transfer ultrasonic vibration to the workpiece, and is also called an ultrasonic bonding chip or an ultrasonic bonding horn.

Technologies related to the material and structure of the tool for ultrasonic bonding and an apparatus for ultrasonic bonding using the tool for ultrasonic bonding are disclosed in, for example, Patent Documents 1 to 4. Each patent document discloses a technology that relates to the tool for ultrasonic bonding and achieves improvement of the bonding property and bonding strength to a bonding target material and cost reduction.

PRIOR ART DOCUMENTS

Patent Documents

Patent Document 1: Japanese Patent Application Laid-Open No. 2006-231402
Patent Document 2: Japanese Patent Application Laid-Open No. 2005-297055
Patent Document 3: Japanese Patent Application Laid-Open No. 2005-254323
Patent Document 4: Japanese Patent Application Laid-Open No. 2005-177812

SUMMARY

Problem to be Solved by the Invention

A tip portion of the above-described tool for ultrasonic bonding includes a protrusion region that contacts with a bonding target material at application of ultrasonic vibration, and typically, a plurality of protrusion portions are formed in the protrusion region.

To achieve improvement of the bonding property and bonding strength to a bonding target material and cost reduction, it has been required to process a wide bonding region of the bonding target material through a single ultrasonic bonding operation. To achieve the requirement, the protrusion region needs to be formed larger, and the number (hereinafter referred to as a "protrusion portion formation number") of the plurality of formed protrusion portions increases along with increase of the protrusion region.

However, when the protrusion portion formation number of the plurality of protrusion portions is too large, variation necessarily occurs in the peeling strength of the bonding target material after ultrasonic bonding, and the bonding property of the bonding target material cannot be excellently maintained.

The present invention is intended to solve the above-described problem and provide a tool for ultrasonic bonding having a structure with which the bonding property of a bonding target material after ultrasonic vibration processing can be excellently maintained with a larger protrusion portion formation number.

Means to Solve the Problem

A tool for ultrasonic bonding according to the present invention is a tool for ultrasonic bonding used for an ultrasonic vibration bonding apparatus configured to pressurize, from above, a bonding target material disposed on a surface of a substrate and apply ultrasonic vibration to bond the bonding target material onto the surface of the substrate. A protrusion region that contacts with the bonding target material at application of ultrasonic vibration is provided at a tip portion of the tool for ultrasonic bonding. The protrusion region includes a plurality of convex portions formed separately from each other. The plurality of convex portions are equally spaced at a first interval in a first direction. The first direction is a longitudinal direction of the protrusion region. A first direction outermost convex portion positioned outermost in the first direction among the plurality of convex portions is disposed separately from an end part of the protrusion region in the first direction by a first direction end part distance. The plurality of convex portions are disposed so that a first disposition condition $\{0.349 \leq EX/DX \leq 0.510\}$ is satisfied where DX represents the first interval and EX represents the first direction end part distance.

Effects of the Invention

The protrusion region in the tool for ultrasonic bonding according to the present invention includes the plurality of convex portions equally spaced at the first interval in the first direction, and the plurality of convex portions are disposed so that the first disposition condition described above is satisfied.

With this configuration, in ultrasonic vibration processing using the tool for ultrasonic bonding according to the present invention, a load distribution on the bonding target material can be set to be an excellent distribution with less variation and accordingly, variation in the peeling strength of the bonding target material can be suppressed with a larger protrusion portion formation number as the number of a plurality of formed protrusions, and thus the bonding property of the bonding target material to the substrate can be excellently maintained.

These and other objects, features, aspects and advantages of the present invention will become more apparent from the following detailed description of the present invention when taken in conjunction with the accompanying drawings.

BRIEF DESCRIPTION OF DRAWINGS

FIGS. 3A to 3C are explanatory diagrams illustrating details of a tip grasping unit and a contact tip portion in the bonding tool according to the embodiment.

FIG. 11 is a graph (2) illustrating the second experiment result when the extension ratio HR satisfies the first disposition condition.

FIG. 12 is a graph (3) illustrating the second experiment result when the extension ratio HR satisfies the first disposition condition.

FIG. 15 is a graph (3) illustrating the third experiment result when the extension ratio HR does not satisfy the first disposition condition.

FIG. 16 is a graph (1) illustrating a fourth experiment result when the extension ratio HR satisfies the first disposition condition.

FIG. 19 is a graph (4) illustrating the fourth experiment result when the extension ratio HR satisfies the first disposition condition.

FIG. 20 is an explanatory diagram illustrating, in a table format, an N value of a protrusion region and actual dimensions of a longitudinal direction interval DX and a longitudinal direction side edge distance EX that used for each of the first to fourth experiment results.

DESCRIPTION OF EMBODIMENT

Embodiment (Entire Configuration)

Figure 1:
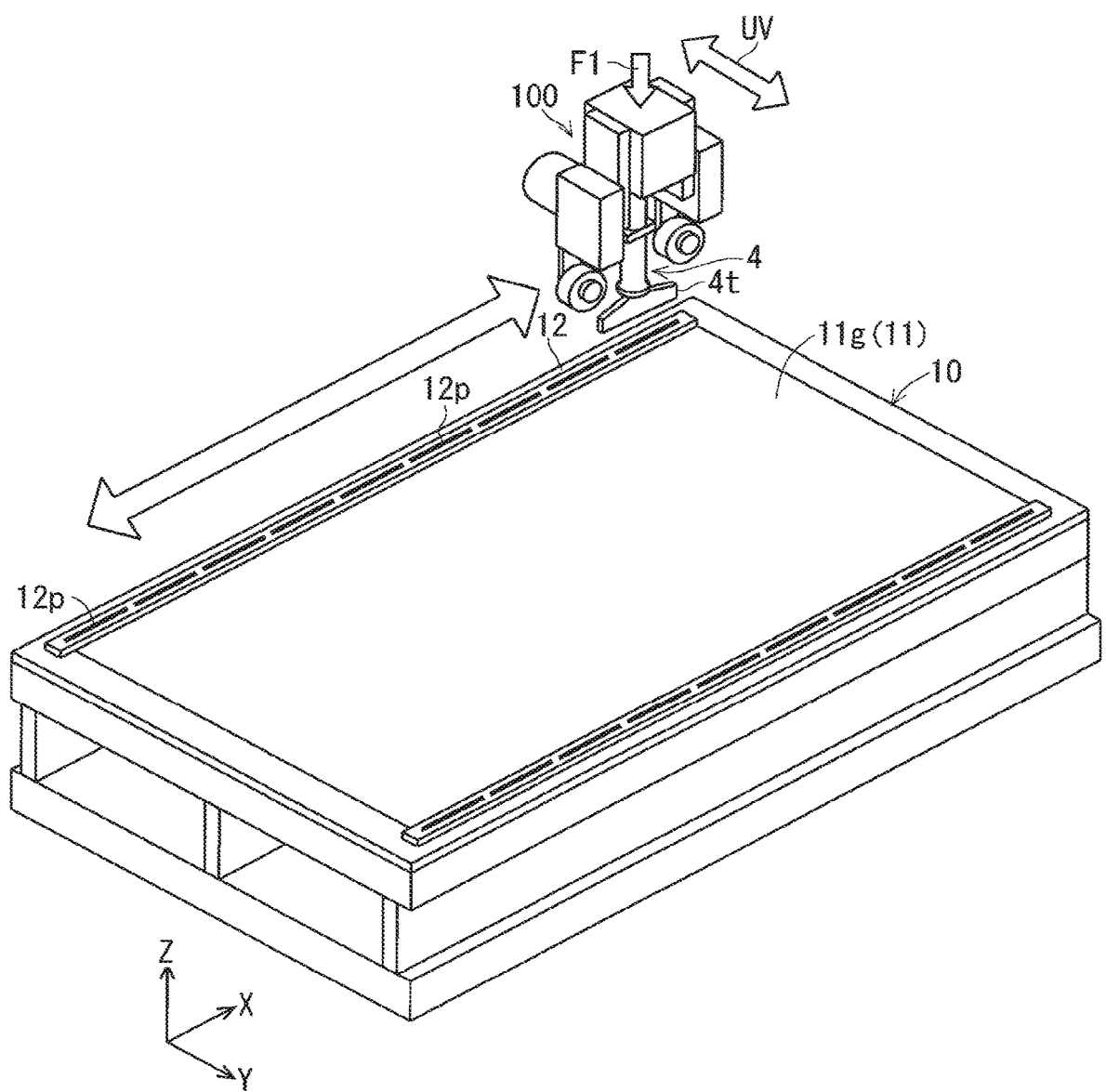
FIG. 1 is a perspective view illustrating a state in which a conductive lead wire is bonded on a solar battery multi-layer film.
Figure 2:
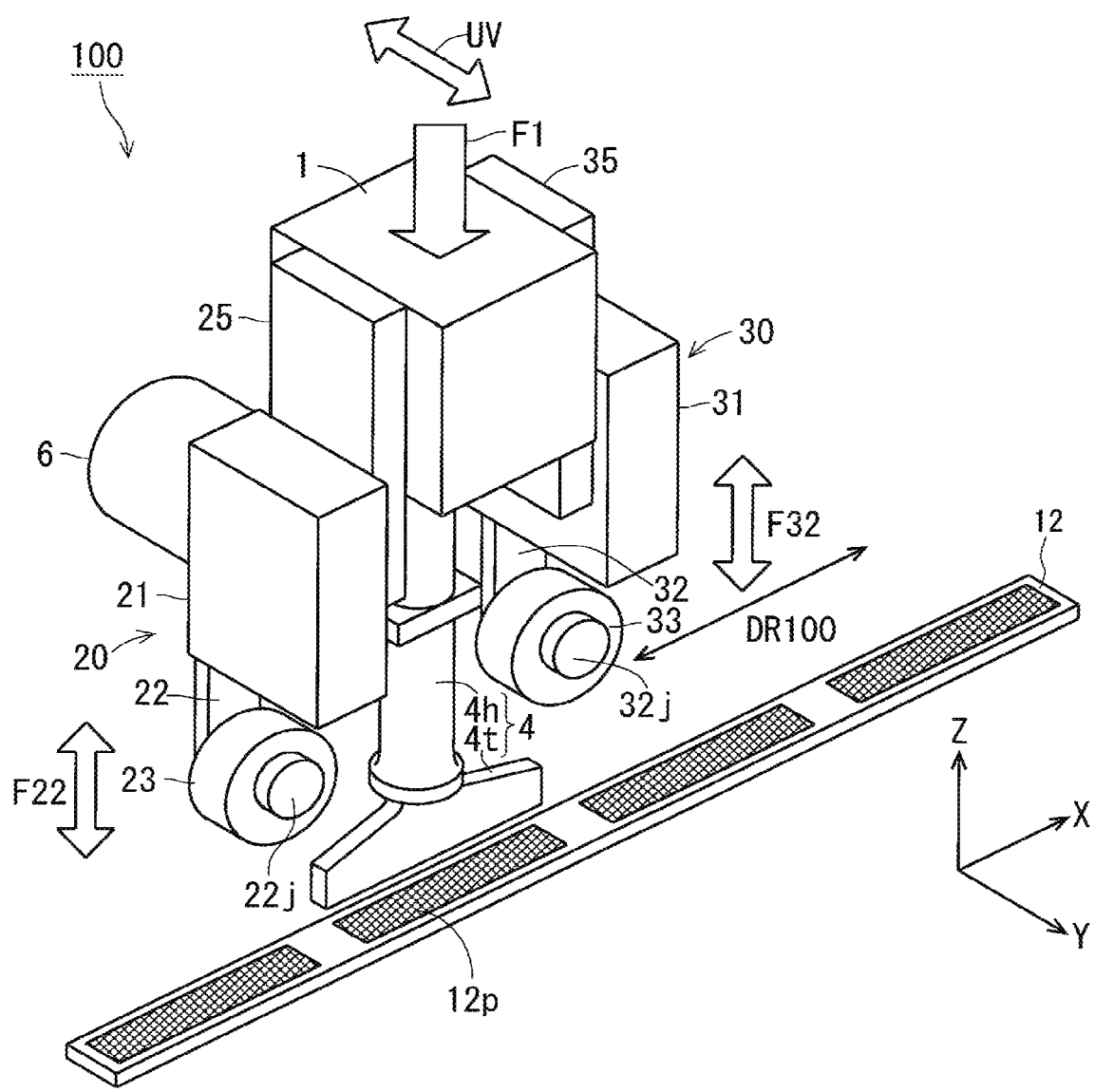
FIG. 2 is an explanatory diagram illustrating the entire configuration of a pressurization-type apparatus for ultrasonic bonding for which a bonding tool according to an embodiment is used.

FIG. 1 is a perspective view illustrating a state in which a glass substrate 11 is disposed on a substrate table 10 and a conductive lead wire 12 is bonded on a solar battery thin film 11g as the top layer of the glass substrate 11. FIG. 2 is an explanatory diagram illustrating the entire configuration of a pressurization-type apparatus 100 for ultrasonic bonding in which a bonding tool 4 according to the embodiment of the present invention is used, and is a perspective view of the apparatus 100 for ultrasonic bonding when obliquely viewed from above. An XYZ orthogonal coordinate system is illustrated as appropriate in FIGS. 1 and 2 and FIGS. 3 to 5 to be described later.

As illustrated in FIGS. 1 and 2, the apparatus 100 for ultrasonic bonding includes a (electrical) cylinder 1, the bonding tool 4, a vibration horn unit 6, a press mechanisms 20 and 30, and the substrate table 10 (refer to FIG. 1). The bonding tool 4 as a tool for ultrasonic bonding according to the present embodiment includes a tip grasping unit 4h and a contact tip portion 4t.

The cylinder 1 is coupled with the bonding tool 4, and drive force (pressing force) F1 of the cylinder 1 is transferred to the bonding, tool 4 so that drive of the bonding tool 4 can be controlled. Specifically, the cylinder 1 can move the bonding tool 4 in the Z-axis direction. The cylinder 1 can also apply a predetermined pressure to the lead wire 12 through the contact tip portion 4t of the bonding tool 4. The material of the lead wire 12 may be, for example, aluminum.

The bonding tool 4 is supported by a holder (not illustrated) and guided in the vertical direction inside the holder. The contact tip portion 4t is disposed at a tip portion of the bonding tool 4 closer to the substrate table 10. The bonding tool 4 is connected with the vibration horn unit 6 so that ultrasonic vibration UV generated by an ultrasonic vibrator 17 (refer to FIG. 6) not illustrated in FIGS. 1 and 2 is transferred to the bonding tool 4 through the vibration horn unit 6. In other words, the ultrasonic vibrator 17 and the vibration horn unit 6 function as an ultrasonic transfer unit configured to drive the bonding tool 4 so that ultrasonic vibration is applied from the contact tip portion 4t.

The contact tip portion 4t is formed at a tip of the bonding tool 4, and includes, at a most tip region, a protrusion region 8 that contacts with the lead wire 12 as a bonding target material in ultrasonic vibration bonding processing.

(Protrusion Region 8 of Contact Tip Portion 4t)

FIGS. 3A to 3C are explanatory diagrams illustrating details of the tip grasping unit 4h and the contact tip portion 4t in the bonding tool 4 according to the present embodiment. In FIGS. 3A to 3C, FIG. 3A illustrates a front view, FIG. 3B illustrates a side view, and FIG. 3C illustrates a bottom view.

As illustrated in FIGS. 3A to 3C, the contact tip portion 4t is connected with the tip grasping unit 4h. As illustrated in FIG. 3C, the protrusion region 8 formed as a surface region at a bottom part 4tb of the contact tip portion 4t, is formed in a rectangular shape having a longitudinal direction along an X direction on an XY plane.

Figure 4A:
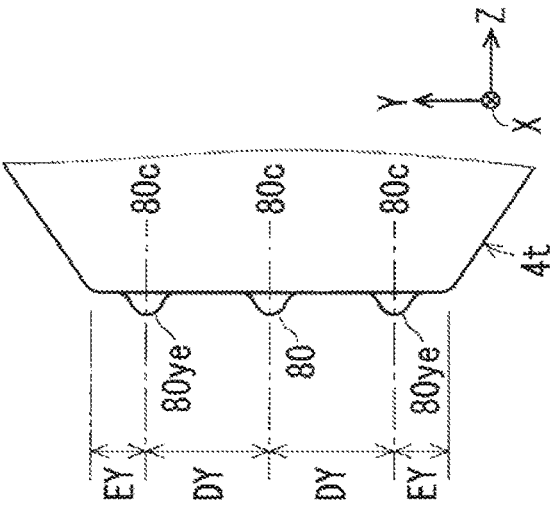
FIGS. 4A to 4C are explanatory diagrams illustrating details of a protrusion region in the bonding tool according to the embodiment.
Figure 4C:
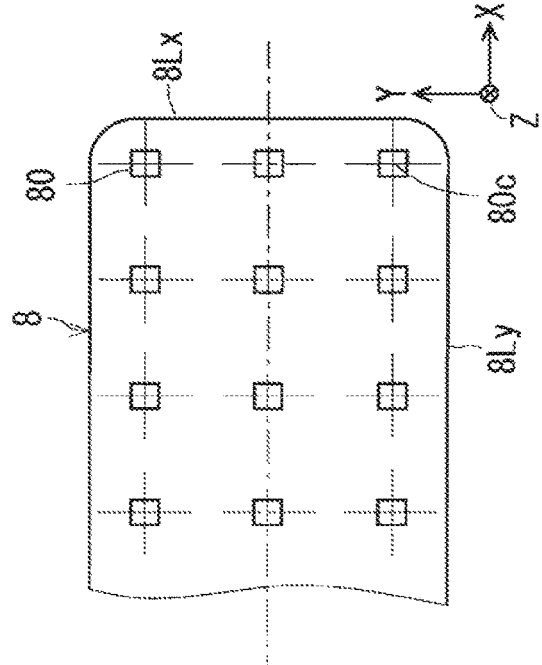
Figure 4B:
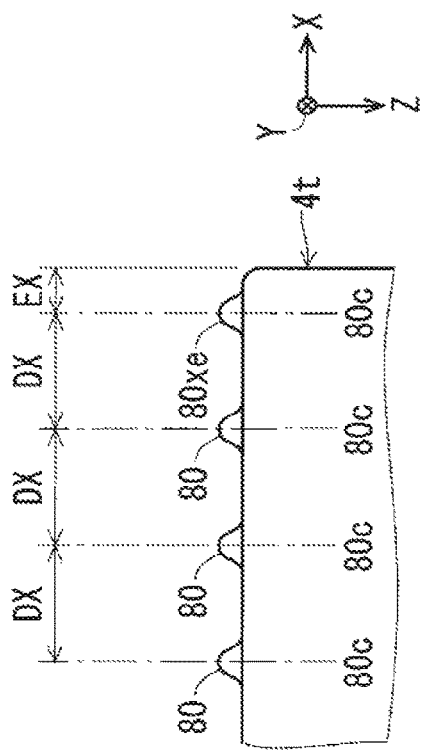

FIGS. 4A to 4C are explanatory diagrams illustrating details of the protrusion region 8 in the bonding tool 4 according to the embodiment. In FIGS. 4A to 4C, FIG. 4A illustrates a bottom view, FIG. 4B illustrates a side view in the X direction, and FIG. 4C illustrates a side view in the Y direction. FIG. 4A illustrates details of a focus region P1 of the protrusion region 8 in FIG. 3B.

As illustrated in FIGS. 4A to 4C and 3C, a plurality of protrusion portions 80 (convex portions) formed separately from each other are provided in an N×M matrix of N (≥2) rows in the X direction (first direction) on the protrusion region 8 and M (≥2) columns in the Y direction (second direction) orthogonal to the X direction. FIGS. 4A to 4C illustrates examples with M=3 and N>3.

As illustrated in FIG. 4B, each of three sets of N protrusion portions 80 formed in the X direction among the plurality of protrusion portions 80 are equally spaced at a longitudinal direction interval DX (first interval) in the X direction. In each of the three sets of N protrusion portions 80, an X direction outermost protrusion portion 80xe (first direction outermost convex portion) positioned outermost in the X direction is disposed separately from a side edge 8Lx (end part) of the protrusion region 8 in the X direction by a longitudinal direction side edge distance (first direction end part distance) EX.

In addition, as illustrated in FIG. 4C, each of N sets of three protrusion portions 80 formed in the Y direction among the plurality of protrusion portions 80 are equally spaced at a transverse direction (short-side direction) interval DY (second interval) in the Y direction. In each of the N sets of three protrusion portions 80, a Y direction outermost protrusion portion 80ye (second direction outermost convex portion) positioned outermost in the Y direction is disposed separately from a side edge 8Ly (end part) of the protrusion region 8 in the Y direction by a transverse direction (short-side direction) side edge distance EY (second direction end part distance).

The longitudinal direction interval DX, the longitudinal direction side edge distance EX, the transverse direction interval DY, and the transverse direction side edge distance EY are set with respect to a central position 80c of the protrusion portions 80 as illustrated in FIGS. 4A to 4C.

The plurality of protrusion portions 80 satisfy a first disposition condition indicated in (1) below and a second disposition condition indicated in (2) below.

First disposition condition $\{0.349 \le EX/DX \le 0.510\}$ (1)

Second disposition condition $\{0.349 \le EY/DY \le 0.510\}$ (2)

The first and second disposition conditions described above have an ideal reference ST of "0.425". The lower limit (0.425 0.425×0.18) of the ideal reference ST of "0.425" is "0.349", and the upper limit (0.425+0.425×0.2) of the ideal reference ST "0.425" is "0.510".

In other words, an extension ratio HR (EX/DX or EY/DY) is set to have an allowable range centered at the ideal reference ST and having a lower limit of "−18%" and an upper limit of "+20%".

Figure 5A:
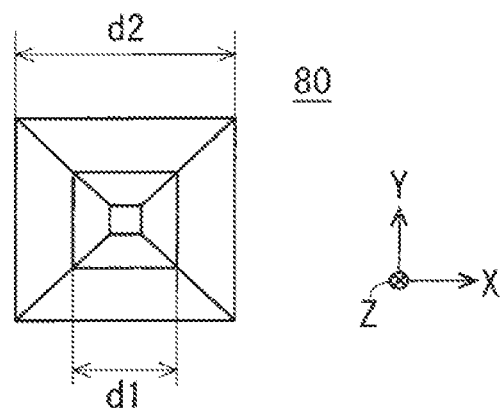
FIGS. 5A and 5B are explanatory diagrams illustrating details of an exemplary configuration of a protrusion portion illustrated in FIGS. 4A to 4C.

FIGS. 5A and 4B are explanatory diagrams illustrating details of an exemplary configuration of each protrusion portion 80. In FIGS. 5A and 4B, FIG. 5A illustrates a top view, and FIG. 5B illustrates a side view.

Figure 5B:
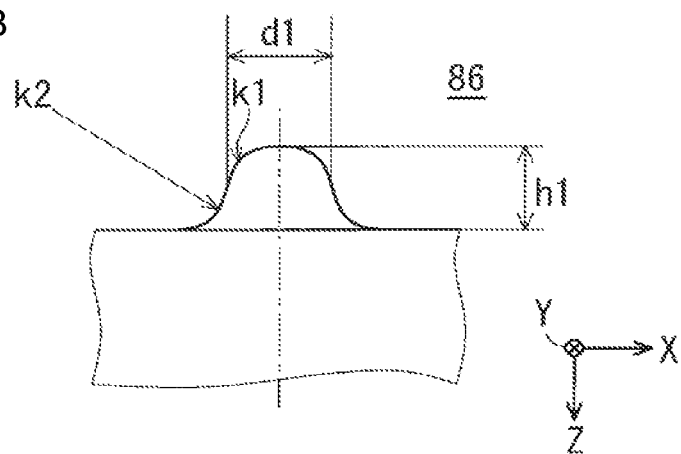

As illustrated in FIGS. 5A and 5B, each protrusion portion 80 has a bottom part shaped in a square with sides having a mounting surface dimension d2 in plan view, and has a middle part shaped in a square with sides having a tip surface dimension d1 (<d2) in plan view. The protrusion portion 80 has a formation height h1 toward the negative Z direction, a side surface part curvature k2 from the bottom part to the middle part, and a tip portion curvature k1 from the middle part to the top part.

Specific dimensions are set as follows, for example: the tip surface dimension d1 is 0.22 mm, the mounting surface dimension d2 is 0.47 mm, the formation height h1 is 0.2 mm, the tip portion curvature k1 is 0.075 (l/mm), and the side surface part curvature k2 (l/mm) is 0.125.

In the apparatus 100 for ultrasonic bonding according to the present embodiment, the bonding tool 4 and the press mechanisms 20 and 30 are integrated such that both side surfaces (surfaces in the X direction) of the cylinder 1 coupled with the bonding tool 4 are coupled with the press mechanisms 20 and 30 (cylinders 21 and 31 thereof) through bonding plates 25 and 35.

The press mechanism 20 (first press member) includes the (electrical) cylinder 21, a press member 22, and a press roller 23, and the press roller 23 (first press roller) can perform a rotational operation centered at a rotational axis 22j of the press member 22. Similarly, the press mechanism 30 (second press mechanism) includes the (electrical) cylinder 31, a press member 32, and a press roller 33, and the press roller 33 (second press roller) can perform a rotational operation centered at a rotational axis 32j of the press member 32.

The press members 22 and 32 are coupled with the cylinders 21 and 31. Thus, drive force (pressing force) F22 from the cylinder 21 is transferred to the press roller 23 through the press member 22 so that the press roller 23 can be moved in the Z-axis direction (negative Z direction). In addition, the cylinder 21 can apply a predetermined pressure to the lead wire 12 through the press roller 23. Similarly, drive force (pressing force) F32 from the cylinder 31 is transferred to the press roller 33 through the press member 32 so that the press roller 33 can be moved in the Z-axis direction (negative Z direction). In addition, the cylinder 31 can apply a predetermined pressure to the lead wire 12 through the press roller 33.

The press rollers 23 and 33 are made of an elastic material such as rubber to press the lead wire 12 by using the press rollers 23 and 33, thereby preventing damage on the lead wire 12.

A drive unit (not illustrated) is coupled with the apparatus 100 for ultrasonic bonding as an integration of the bonding tool 4, the press mechanisms 20 and 30, and the like, and can execute moving processing of moving the apparatus 100 for ultrasonic bonding in an apparatus operation direction DR100.

(Glass Substrate)

As illustrated in FIG. 1, the glass substrate 11 on the surface of which the solar battery thin film 11g is formed is installed on the substrate table 10, and the lead wire 12 is provided in the X direction on the solar battery thin film 11g of the glass substrate 11. Accordingly, the lead wire 12 has a formation length direction in the X direction (first direction), and a formation width direction in the Y direction (second direction).

Although not illustrated, at least one hole is drilled through an upper surface of the substrate table 10, and the glass substrate 11 is fixed to the substrate table 10 by vacuum contact through the hole.

At execution of ultrasonic vibration processing, the conductive lead wire 12 is disposed in the X direction on the solar battery thin film 11g (of the glass substrate 11). In this state, the bonding tool 4 executes ultrasonic vibration processing in which the ultrasonic vibration UV generated by the ultrasonic vibrator and transferred through the vibration horn unit 6 is applied onto an ultrasonic bonding point 12p of the lead wire 12 from the protrusion region 8 of the contact tip portion 4t of the bonding tool 4 while a predetermined pressure toward the substrate table 10 is applied to the lead wire 12 through the drive force F1 from the cylinder 1, thereby bonding the lead wire 12 to the solar battery thin film 11g of the glass substrate 11.

(Ultrasonic Vibration Processing)

The following describes operation contents of pressurization-type ultrasonic vibration processing using the apparatus 100 for ultrasonic bonding according to the present embodiment with reference to FIGS. 1 and 2.

First, the thin glass substrate 11 on the surface of which the solar battery thin film 11g is formed is installed on the substrate table 10. Then, the glass substrate 11 is fixed to the substrate table 10 by vacuum contact through the hole (not illustrated) provided to the substrate table 10.

Subsequently, the conductive thin lead wire 12 is wound around a reel (not illustrated). The lead wire 12 is drawn out from the reel and disposed at a predetermined place on the solar battery thin film 11g in the X direction.

Subsequently, pressing processing is executed in which the press rollers 23 and 33 of the press mechanisms 20 and 30 perform pressing (pressing toward the substrate table 10) on the lead wire 12 by the pressing forces F22 and F32 of the cylinders 21 and 31.

Then, while the lead wire 12 is being pressed by the press rollers 23 and 33, the bonding tool 4 is moved down toward the lead wire 12 by the drive force F1 of the cylinder 1. When the protrusion region 8 of the contact tip portion 4t of the bonding tool 4, in other words, the plurality of protrusion portions 80 contact with the lead wire 12, a predetermined pressure toward the substrate table 10 is applied to the lead wire 12 by the drive force F1 of the cylinder 1.

While the lead wire 12 is pressed by the press rollers 23 and 33 in the pressing processing by the press mechanisms 20 and 30 and the bonding tool 4 applies the predetermined pressure to the lead wire 12 as described above, the ultrasonic vibrator 17 generates the ultrasonic vibration UV. The generated ultrasonic vibration UV is transferred to the bonding tool 4 through the vibration horn unit 6. Then, the protrusion region 8 of the contact tip portion 4t of the bonding tool 4 performs the ultrasonic vibration UV at a predetermined frequency (for example, 20 to 40 kHz) and a predetermined amplitude (10 μm or smaller; for example, 4 to 5 μm approximately to prevent damage on the glass substrate 11).

In this manner, while the lead wire 12 is disposed on the solar battery thin film 11g of the glass substrate 11, the bonding tool 4 as a tool for ultrasonic bonding is driven so that, while the predetermined pressure is applied toward the substrate table 10, ultrasonic vibration is applied to the ultrasonic bonding point 12p (application part) on the lead wire 12 from the protrusion region 8 including the plurality of protrusion portions 80 by the vibration horn unit 6 and the ultrasonic transfer unit including the ultrasonic vibrator.

The vibration direction of the ultrasonic vibration UV may be, for example, a direction parallel to the X-axis direction (which is the extension direction of the lead wire 12), or a direction parallel to the Y axis (which is the width direction of the lead wire 12), but is desirably the direction parallel to the Y axis. In this manner, when the ultrasonic vibration processing using the bonding tool 4 is performed, the ultrasonic vibration UV is applied to the ultrasonic bonding point 12p of the lead wire 12 through the protrusion region 8 of the contact tip portion 4t.

As described above, the lead wire 12 is bonded to the glass substrate 11 by executing the pressurization-type ultrasonic vibration processing using the bonding tool 4 on the lead wire 12 while pressing the lead wire 12 by the press rollers 23 and 33.

The pressing processing by the press mechanisms 20 and 30 is executed by applying pressure to the lead wire 12 by the press rollers 23 and 33 in a magnitude that no damage is caused on the thin glass substrate 11, and the pressure is set to, for example, a pressure of 10 kg approximately, depending on the material and thickness of the glass substrate 11 (in particular, the solar battery thin film 11g). The press rollers 23 and 33 of the press mechanisms 20 and 30 only contact with the lead wire 12, but do not contact with the glass substrate 11 (solar battery thin film 11g) at pressing.

In the apparatus 100 for ultrasonic bonding, the above-described ultrasonic vibration processing is executed by the bonding tool 4 while both sides of the ultrasonic bonding point 12p of the lead wire 12 are pressed through the pressing processing by the press rollers 23 and 33 of the press mechanisms 20 and 30.

When the lead wire 12 is pressed by the press rollers 23 and 33, the glass substrate 11 is pressed against the substrate table 10. This further strengthens fixation of the glass substrate 11 to the substrate table 10, thereby preventing the glass substrate 11 from moving relative to the substrate table 10 when the pressurization-type ultrasonic vibration processing is performed on the lead wire 12.

In this manner, when the fixation of the glass substrate 11 is strengthened, only the lead wire 12 can be subjected to ultrasonic vibration at execution of the ultrasonic vibration processing by the bonding tool 4. Accordingly, the energy of ultrasonic vibration by the bonding tool 4 can be efficiently converted into frictional energy at a contact part between the glass substrate 11 and the lead wire 12. Thus, the bonding of the lead wire 12 and the glass substrate 11 by ultrasonic vibration can be performed more efficiently in a shorter time.

At the ultrasonic vibration processing, a gap always exists between each of the press rollers 23 and 33 and the ultrasonic bonding point 12p, and thus lead-line lift (deflection) potentially occurs in a region (hereinafter referred to as a "lead wire gap formation region") in which the gap is formed of the lead wire 12. In addition, when the interval between the ultrasonic bonding points 12p is set to be relatively large, lead-line lift potentially occurs to the lead wire 12 in an inter-bonding-point formation region formed between the adjacent ultrasonic bonding points 12p on the lead wire 12.

Subsequently, the apparatus 100 for ultrasonic bonding executes moving processing of the press mechanisms 20 and 30, which is performed when the ultrasonic vibration processing is not executed.

The bonding tool 4 is moved in the Z-axis direction (positive Z direction) by the drive force F1 from the cylinder 1 and is lifted from the substrate table 10. In other words, after the ultrasonic vibration processing of bonding the lead wire 12 to the glass substrate 11 is executed, the apparatus 100 for ultrasonic bonding moves the bonding tool 4 upward by the drive force F1 of the cylinder 1 to cancel the state of contact with the lead wire 12.

The pressure on the lead wire 12 by the press rollers 23 and 33 of the press mechanisms 20 and 30 is set so that no damage is provided to the thin glass substrate 11, the rotational operation of the press rollers 23 and 33 centered at the rotational axes 22j and 32j can be executed on the lead wire 12, and the press mechanisms 20 and 30 can move on the lead wire 12 together with the bonding tool 4 while pressing the lead wire 12.

In the above-described state, the moving processing of moving the apparatus 100 for ultrasonic bonding in the apparatus operation direction DR100 is executed by the drive unit (not illustrated) coupled with the apparatus 100 for ultrasonic bonding. Alternatively, the substrate table 10 to which the glass substrate 11 is fixed through vacuum contact may be moved in the apparatus operation direction DR100 without the drive unit, thereby executing moving processing of the apparatus 100 for ultrasonic bonding relative to the substrate table 10 in the apparatus operation direction DR100.

Accordingly, the moving processing of the apparatus 100 for ultrasonic bonding is executed in which the press rollers 23 and 33 move on the lead wire 12 in the apparatus operation direction DR100 through the rotational operation of the press rollers 23 and 33. Then, the moving processing is stopped in a state in which the contact tip portion 4t of the bonding tool 4 is positioned above the next ultrasonic bonding point 12p to which ultrasonic vibration is to be applied.

As a result, during the moving processing, one of the press rollers 23 and 33 always moves on the above-described lead wire gap formation region of the lead wire 12 while pressing. Thus, when lead-line lift occurs in the lead wire gap formation region of the lead wire 12 at execution of the above-described ultrasonic vibration processing, the lead-line lift can be reliably removed through the pressing by one of the press rollers. Similarly, when lead lift occurs in the above-described inter-bonding-point formation region, the lead lift can be reliably removed.

In this manner, the press mechanisms 20 and 30 (first and second press mechanisms) of the apparatus 100 for ultrasonic bonding according to the present embodiment execute the moving processing in which the press rollers 23 and 33 move on the lead wire 12 (including the lead wire gap formation region at previous execution of the ultrasonic vibration processing) while pressing the lead wire 12 after execution of the ultrasonic vibration processing by the bonding tool 4.

Accordingly, at least one of the press rollers 23 and 33 (first and second press rollers) can press on the above-described lead wire gap formation region and the above-described inter-bonding-point formation region in the moving processing of the apparatus 100 for ultrasonic bonding. As a result, an effect that lead-line lift occurring to the lead wire 12 is reliably removed and the lead wire 12 is accurately bonded onto the glass substrate 11 can be achieved in the moving processing of the apparatus 100 for ultrasonic bonding.

(Control Unit)

Figure 6:
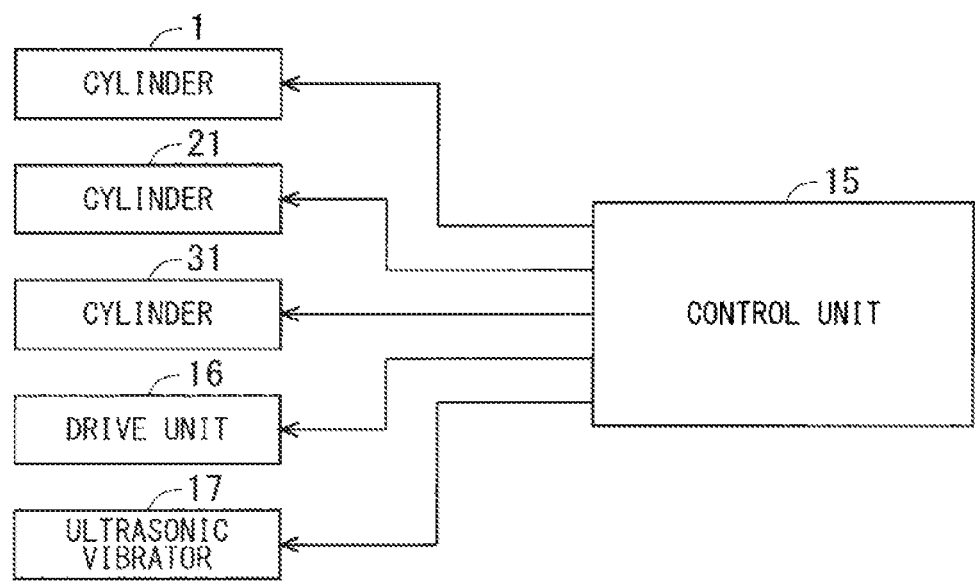
FIG. 6 is a block diagram schematically illustrating a control system of the apparatus for ultrasonic bonding.

FIG. 6 is a block diagram schematically illustrating a control system of the apparatus 100 for ultrasonic bonding. As illustrated in FIG. 6, the apparatus 100 for ultrasonic bonding further includes a control unit 15, and the control unit 15 controls drive of the cylinders 1, 21, and 31, a drive unit 16, and the ultrasonic vibrator 17. The drive unit 16 executes the moving processing of moving the entire apparatus 100 for ultrasonic bonding in the apparatus operation direction DR100, and the ultrasonic vibrator 17 executes the ultrasonic vibration processing of providing the ultrasonic vibration UV to the bonding tool 4 through the vibration horn unit 6.

The control unit 15 can control the pressing forces F22 and F32 of the press rollers 23 and 33 in a variable manner by controlling drive of the cylinders 21 and 31, and can control the moving processing of the apparatus 100 for ultrasonic bonding in the apparatus operation direction DR100 by controlling the drive unit 16.

In addition, the control unit 15 can control the drive force F1 applied to the bonding tool 4 in the Z-axis direction by controlling drive of the cylinder 1, and can control the ultrasonic vibration processing of the bonding tool 4 by controlling the ultrasonic vibrator 17. Accordingly, the control unit 15 can control conditions (frequency, amplitude, and pressurization force) of the ultrasonic vibration bonding processing by the bonding tool 4 in a variable manner in accordance with, for example, an instruction from a user.

The pressing force applied to the glass substrate 11 by the press mechanisms 20 and 30 needs to be changed in accordance with the material and thickness of the glass substrate 11, the material and thickness of the solar battery thin film 11g, and the conditions of the ultrasonic vibration bonding processing. To achieve this, the control unit 15 controls the pressing forces F22 and F32 applied by the press mechanisms 20 and 30 through the cylinders 21 and 31 in a variable manner in accordance with an instruction from the user. Specifically, when each information (such as the material and thickness of the glass substrate 11, the material and thickness of each film included in the solar battery thin film 11g, and the conditions of the ultrasonic vibration bonding processing) is input to the control unit 15, the pressing forces F22 and F32 of the press mechanisms 20 and 30 can be controlled to pressing forces determined from an information table set in advance and the information. The information table unambiguously defines a pressing force for each information.

As described above, at execution of the ultrasonic vibration processing and after the execution, the pressing forces F22 and F32 of the press rollers 23 and 33 can be controlled as appropriate in accordance with the conditions of the ultrasonic vibration bonding processing by driving the cylinders 21 and 31 of the press mechanisms 20 and 30 under control of the control unit 15.

In this manner, for example, the pressing forces F22 and F32 applied by the press mechanisms 20 and 30 and the conditions of the ultrasonic vibration bonding processing performed by the bonding tool 4 are controlled in a variable manner under control of the control unit 15. Thus, the pressing forces F22 and F32 applied by the press mechanisms 20 and 30, drive contents of the drive unit 16, and the conditions of the ultrasonic vibration bonding processing performed by the bonding tool 4 (the cylinder 1 and the ultrasonic vibrator 17) can be changed as appropriate in accordance with, for example, the thicknesses and materials of the glass substrate 11 and the solar battery thin film 11g.

As a result, the apparatus 100 for ultrasonic bonding according to the present embodiment can reliably reduce the occurrence probability of the lead-line lift of the lead wire 12 without affecting the glass substrate 11 (including the solar battery thin film 11g), and can appropriately change the pressing forces F22 and F32, the drive contents of the drive unit 16, and the conditions of the ultrasonic vibration bonding processing so that the lead wire 12 is bonded on the glass substrate 11.

The above-described effect can be obtained by controlling at least the pressing forces F22 and F32 applied by the press mechanisms 20 and 30 through the control unit 15.

Effects of the Present Embodiment (First Experiment Result)

Figure 7:
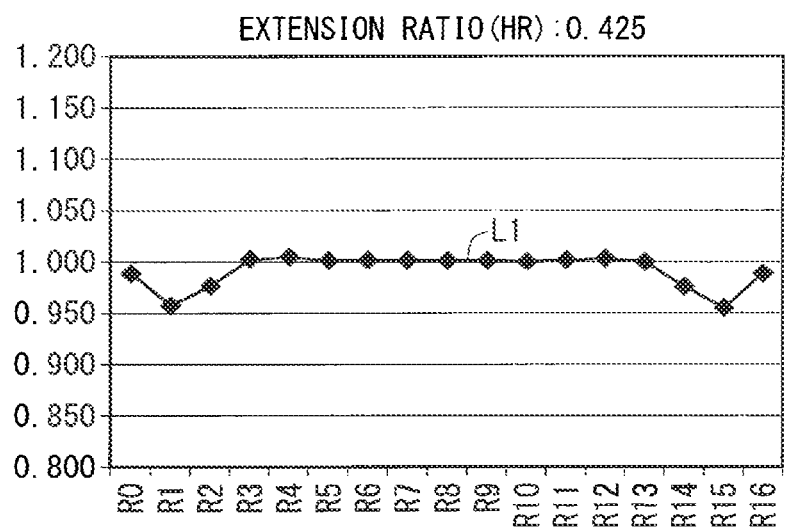
FIG. 7 is a graph (1) illustrating a first experiment result when an extension ratio HR satisfies a first disposition condition.
Figure 8:
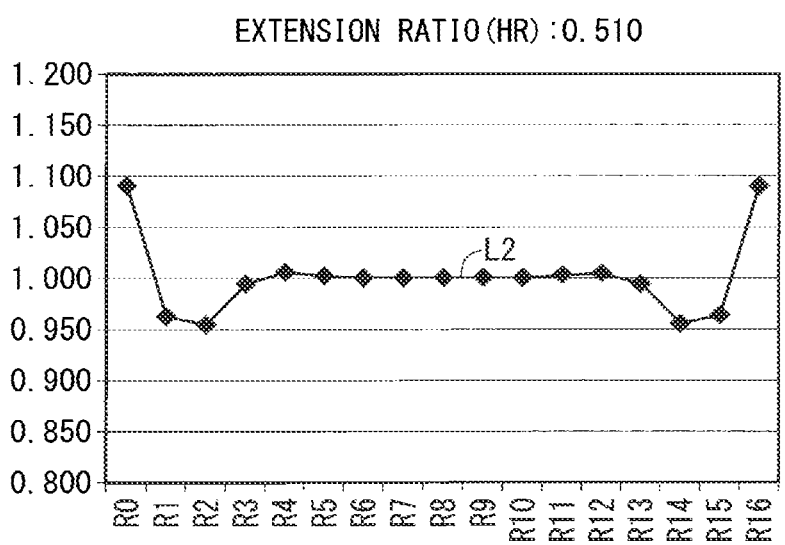
FIG. 8 is a graph (2) illustrating the first experiment result when the extension ratio HR satisfies the first disposition condition.
Figure 9:
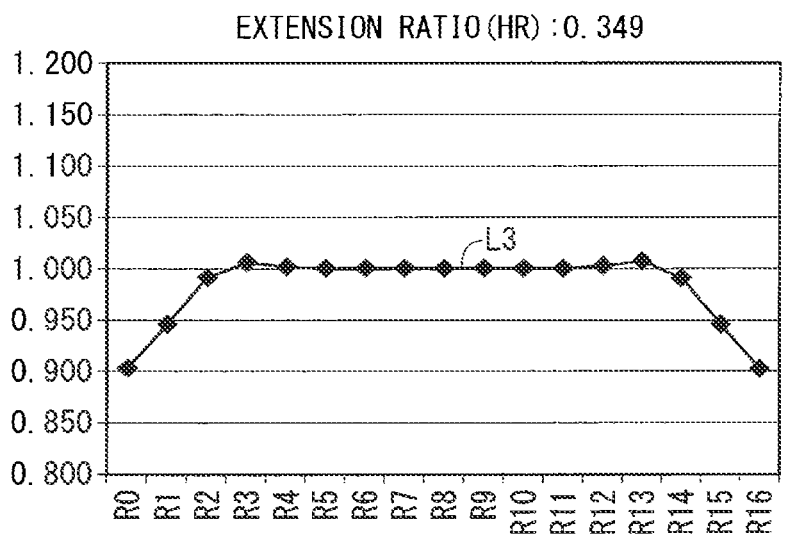
FIG. 9 is a graph (3) illustrating the first experiment result when the extension ratio HR satisfies the first disposition condition.

FIGS. 7 to 9 are graphs illustrating a first experiment result (simulation result) when the extension ratio HR satisfies the first disposition condition, and specifically, graphs (1 to 3) illustrating a load distribution on 17 protrusion portions 80 for N=17 with EX/DX as the extension ratio HR. FIG. 7 illustrates a case in which the extension ratio HR is "0.425" of the ideal reference ST, FIG. 8 illustrates a case in which the extension ratio HR is "0.510" as the upper limit value of the ideal reference ST, and FIG. 9 illustrates a case in which the extension ratio HR is "0.349" as the lower limit value of the ideal reference ST.

In each of FIGS. 7 to 9, the horizontal axis represents formation positions R0 to R16 of the 17 protrusion portions 80 in the X direction, and the formation positions R0 and R16 indicate the positions of the respective X direction outermost protrusion portions 80xe. The vertical axis represents a load degree, which is a ratio relative to a reference load when the reference load is taken to be "1".

The inventors determine, within ±10% from the reference load, in other words, when the load distribution on the 17 protrusion portions 80 on the lead wire 12 in the ultrasonic vibration processing satisfies {0.90 to 1.10} at the formation positions R0 to R16, that variation in the peeling strength of the lead wire 12 is suppressed in an allowable range, and the bonding property of the lead wire 12 as a bonding target material to the solar battery thin film 11g is excellently maintained at the ultrasonic bonding point 12p after the ultrasonic vibration processing.

As illustrated with the load distribution line L1 in FIG. 7, when the extension ratio HR is equal to the ideal reference ST, the load does not exceed "0.950" at the formation positions R1 and R15, which are most separated from the reference load, and thus the bonding property of the lead wire 12 to the solar battery thin film 11g can be excellently maintained at the ultrasonic bonding point 12p after the ultrasonic vibration processing.

As illustrated with the load distribution line L2 in FIG. 8, when the extension ratio HR is equal to the upper limit of the ideal reference ST, the load is slightly below "1.100" at the formation positions R0 and R16, which are most separated from the reference load, and thus the bonding property of the lead wire 12 to the solar battery thin film 11g can be excellently maintained. Since the load is close to "1.100" at the formation positions R0 and R16, it is presumed that the bonding property of the lead wire 12 to the solar battery thin film 11g potentially cannot be excellently maintained when the extension ratio HR exceeds the upper limit value "0.510".

As illustrated with the load distribution line L3 in FIG. 9, when the extension ratio HR is equal to the lower limit of the ideal reference ST, the load is "0.9" at the formation positions R0 and R16, which are most separated from the reference load, and thus the bonding property of the lead wire 12 to the solar battery thin film 11g can be excellently maintained. Since the load is substantially equal to "0.9" at the formation positions R0 and R16, it is presumed that the bonding property of the lead wire 12 to the solar battery thin film 11g potentially cannot be excellently maintained when the extension ratio HR is below the lower limit value "0.349".

In this manner, N protrusion portions 80 equally spaced at the longitudinal direction interval DX (first interval) in the X direction (first direction) as the longitudinal direction of the protrusion region 8 in the bonding tool 4 according to the present embodiment are each disposed so that the above-described first disposition condition defined by the longitudinal direction interval DX and the longitudinal direction side edge distance EX (first direction end part distance) is satisfied.

Thus, as indicated by the first experiment result illustrated in FIGS. 7 to 9, in the ultrasonic vibration processing by the apparatus 100 for ultrasonic bonding using the bonding tool 4 according to the present embodiment, the load distribution on the ultrasonic bonding point 12p of the lead wire 12 can be suppressed at an excellent distribution with less variation. As a result, the apparatus 100 for ultrasonic bonding including the bonding tool 4 according to the present embodiment can suppress variation in the peeling strength of the lead wire 12 with a larger protrusion portion formation number as the formation number of the plurality of protrusion portions 80 formed in the protrusion region 8 of the bonding tool 4, and thus the bonding property of the lead wire 12 to the solar battery thin film 11g can be excellently maintained.

The first experiment result indicates the case with EX/DX as the extension ratio HR. The bonding property of the lead wire 12 to the solar battery thin film 11g is affected by variation in the peeling strength of the lead wire 12 in the X direction as the longitudinal direction of the protrusion region 8 (formation direction of the lead wire 12), in which the protrusion portions 80 are formed in a larger number (N>M). Thus, variation in the peeling strength of the lead wire 12 can be suppressed in an allowable range basically when the extension ratio HR (EX/DX) in the X direction satisfies the above-described first disposition condition.

The protrusion region 8 in the bonding tool 4 according to the present embodiment also satisfies the above-described second disposition condition in a case with EY/DY as the extension ratio HR in addition to the above-described first disposition condition. Thus, the first experiment result indicates that the bonding property of the lead wire 12 to the solar battery thin film 11g can be excellently maintained in a reliable manner by reliably suppressing variation in the peeling strength of the lead wire 12 in an allowable range in the Y direction as the transverse direction of the protrusion region 8 in addition to the X direction.

(Second Experiment Result)

Figure 10:
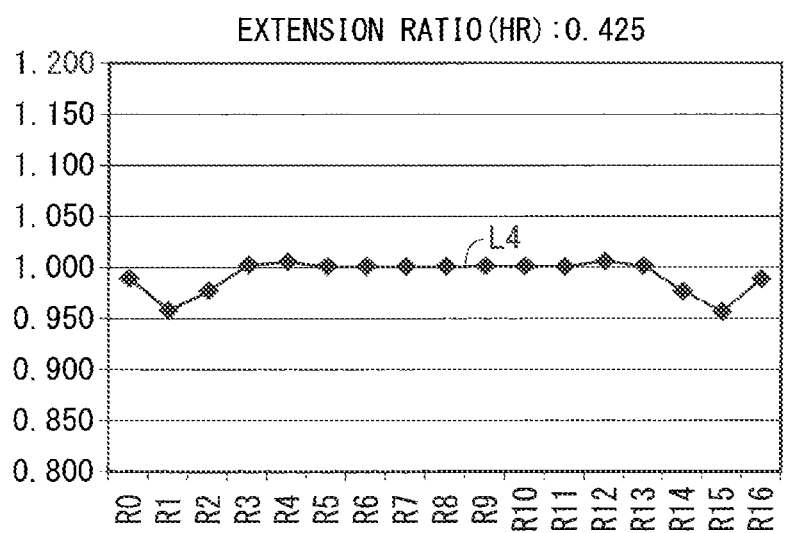
FIG. 10 is a graph (1) illustrating a second experiment result when the extension ratio HR satisfies the first disposition condition.

FIGS. 10 to 12 are graphs illustrating a second experiment result (simulation result) when the extension ratio HR satisfies the first disposition condition, and specifically, graphs (1 to 3) illustrating a load distribution on the protrusion portions 80 when the extension ratio HR is "0.425" of the ideal reference ST with EX/DX as the extension ratio HR. However, the second experiment result is obtained for different values of N as the number of protrusion portions disposed in the X direction, and FIG. 10 illustrates a case with N=17, FIG. 11 illustrates a case with N=7, and FIG. 12 illustrates a case with N=75.

In FIG. 10, the horizontal axis represents formation positions R0 to R16 of 17 protrusion portions 80, and the formation positions R0 and R16 indicate the positions of the respective X direction outermost protrusion portions 80xe.

In FIG. 11, the horizontal axis represents formation positions R0 to R6 of seven protrusion portions 80, and the formation positions R0 and R6 indicate the positions of the respective X direction outermost protrusion portions 80xe.

In FIG. 12, the horizontal axis represents formation positions R0 to R74 of 75 protrusion portions 80, and the formation positions R0 and R74 indicate the positions of the respective X direction outermost protrusion portions 80xe. The vertical axis is same as that of the first experiment result illustrated in FIGS. 7 to 9.

As illustrated with the load distribution line L4 in FIG. 10, when the extension ratio HR is equal to the ideal reference ST with N=17, the load slightly exceeds "0.950" at the formation positions R1 and R15, which are most separated from the reference load, and thus the bonding property of the lead wire 12 to the solar battery thin film 11g can be excellently maintained at the ultrasonic bonding point 12p after the ultrasonic vibration processing.

As illustrated with the load distribution line L5 in FIG. 11 when the extension ratio HR is equal to the ideal reference ST with N=7, the load slightly exceeds "0.950" at the formation positions R1 and R5, which are most separated from the reference load, and thus the bonding property of the lead wire 12 to the solar battery thin film 11g can be excellently maintained.

As illustrated with the load distribution line L6 in FIG. 12, when the extension ratio HR is equal to the ideal reference ST with N=75, the load slightly exceeds "0.950" at the formation positions R1 and R73, which are most separated from the reference load, and thus the bonding property of the lead wire 12 to the solar battery thin film 11g can be excellently maintained.

In this manner, when N protrusion portions 80 formed in the X direction as the longitudinal direction of the protrusion region 8 in the bonding tool 4 according to the present embodiment satisfy the above-described first disposition condition, variation in the peeling strength of the lead wire 12 can be suppressed in an allowable range irrespective of the formation number N in the X direction, and thus the bonding property of the lead wire 12 to the solar battery thin film 11g can be excellently maintained.

The protrusion region 8 in the bonding tool 4 according to the present embodiment satisfies the above-described second disposition condition in the case with EY/DY as the extension ratio HR. Thus, the second experiment result indicates that variation in the peeling strength of the lead wire 12 can be reliably suppressed in an allowable range in the Y direction irrespective of the formation number M in the Y direction, and thus the bonding property of the lead wire 12 to the solar battery thin film 11g can be excellently maintained in a reliable manner.

(Third Experiment Result)

Figure 13:
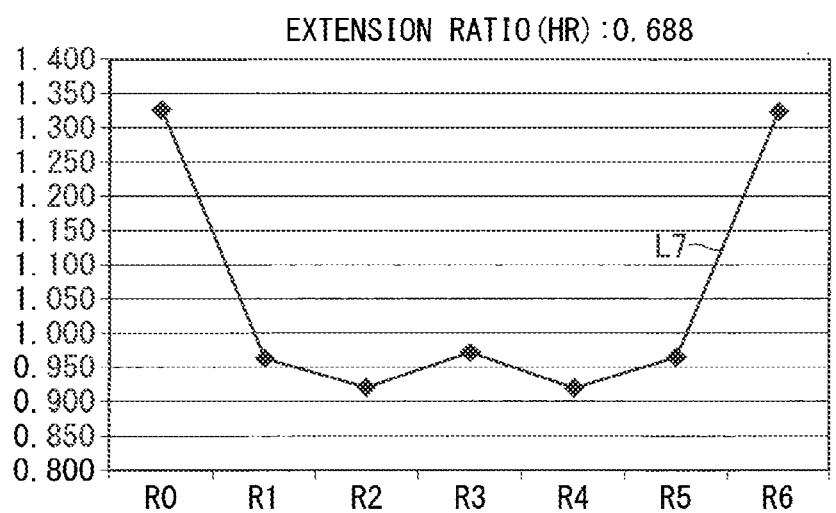
FIG. 13 is a graph (1) illustrating a third experiment result when the extension ratio HR does not satisfy the first disposition condition.
Figure 14:
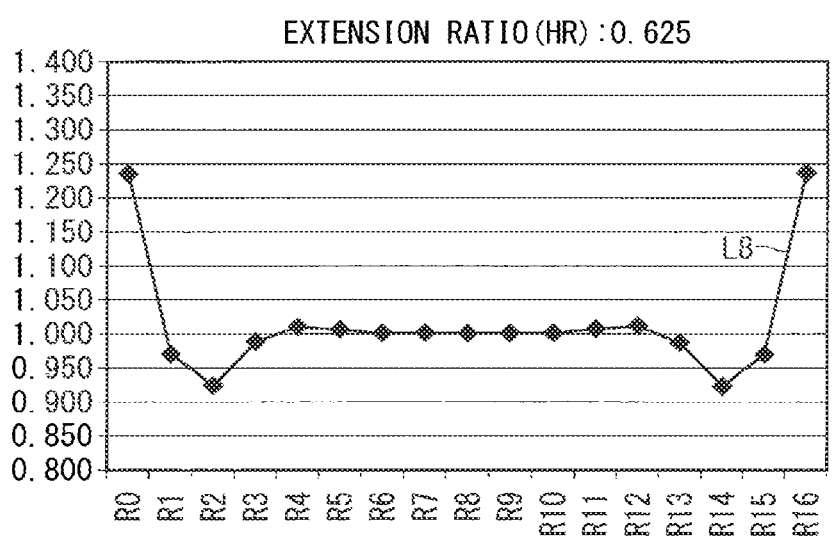
FIG. 14 is a graph (2) illustrating the third experiment result when the extension ratio HR does, not satisfy the first disposition condition.

FIGS. 13 to 15 are graphs illustrating a third experiment result (simulation result) when the extension ratio HR does not satisfy the first disposition condition, and specifically, graphs (1 to 3) illustrating a load distribution on protrusion portions 80 with EX/DX as the extension ratio HR. FIG. 13 illustrates a case with N=7, FIG. 14 illustrates a case with N=17, and FIG. 15 illustrates a case with N=50.

In FIG. 13, the horizontal axis represents formation positions R0 to R6 of seven protrusion portions 80, and the formation positions R0 and R6 indicate the positions of the respective X direction outermost protrusion portions 80xe.

In FIG. 14, the horizontal axis represents the formation positions R0 to R16 of the 17 protrusion portions 80, and the formation positions R0 and R16 indicate the positions of the respective X direction outermost protrusion portions 80xe.

In FIG. 15, the horizontal axis represents formation positions R0 to R49 of 50 protrusion portions 80, and the formation positions R0 and R49 indicate the positions of the respective X direction outermost protrusion portions 80xe. The vertical axis is same as those of the first and second experiment results illustrated in FIGS. 7 to 9 and FIGS. 10 to 12.

As illustrated with the load distribution line L7 in FIG. 13, when the extension ratio HR exceeds "0.688" and the upper limit value "0.510" and does not satisfy the above-described first disposition condition with N=7, the load exceeds "1.300" at the formation positions R0 and R6, which are most separated from the reference load, and thus the bonding property of the lead wire 12 to the solar battery thin film 11g cannot be excellently maintained.

As illustrated with the load distribution line L8 in FIG. 14, when the extension ratio HR exceeds "0.625" and the upper limit value "0.510" and does not satisfy the above-described first disposition condition with N=17, the load reaches near "1.25" at the formation positions R0 and R16, which are most separated from the reference load, and thus the bonding property of the lead wire 12 to the solar battery thin film 11g cannot be excellently maintained.

As illustrated with the load distribution line L9 in FIG. 15, when the extension ratio HR exceeds "0.600" and the upper limit value "0.510" and does not satisfy the above-described first disposition condition with N=50, the load reaches "1.20" at the formation positions R0 and R49, which are most separated from the reference load, and thus the bonding property of the lead wire 12 to the solar battery thin film 11g cannot be excellently maintained.

In this manner, the third experiment result indicates that variation in the peeling strength of the lead wire 12 cannot be suppressed in an allowable range irrespective of the formation number N when N protrusion portions 80 formed in the X direction as the longitudinal direction of the protrusion region 8 according to the present embodiment do not satisfy the above-described first disposition condition.

(Fourth Experiment Result)

Figure 17:
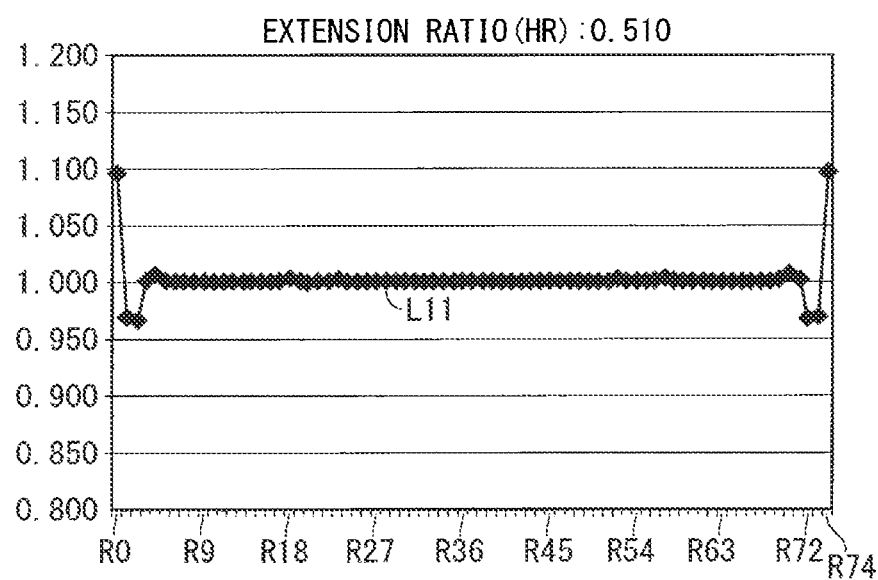
FIG. 17 is a graph (2) illustrating the fourth experiment result when the extension ratio HR satisfies the first disposition condition.
Figure 18:
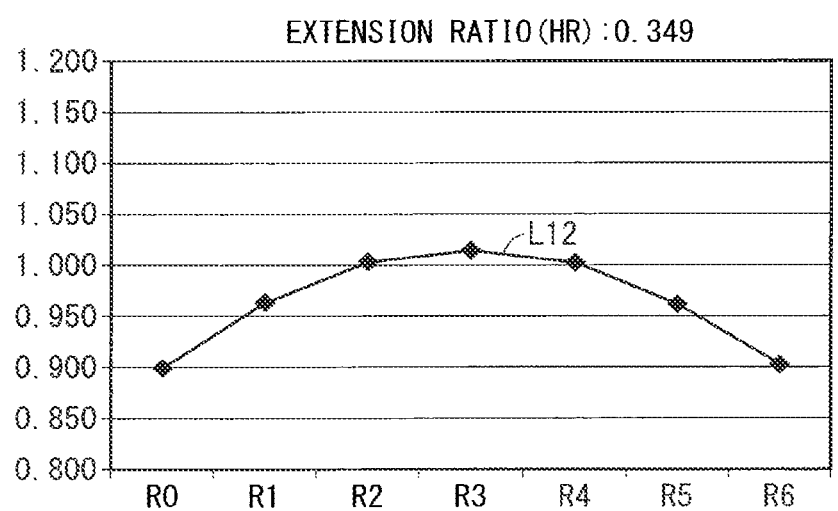
FIG. 18 is a graph (3) illustrating the fourth experiment result when the extension ratio HR satisfies the first disposition condition.

FIGS. 16 to 19 are graphs illustrating a fourth experiment result when the extension ratio HR satisfies the first disposition condition (simulation result), and specifically, graphs (1 to 4) illustrating a load distribution on protrusion portions 80 when the extension ratio HR satisfies the first disposition condition with EX/DX as the extension ratio HR. FIGS. 16 and 18 illustrate a case with N=7, and FIGS. 17 and 19 illustrate a case with N=75.

In FIGS. 16 and 18, the horizontal axis represents formation positions R0 to R6 of seven protrusion portions 80, and the formation positions R0 and R6 indicate the positions of the respective X direction outermost protrusion portions 80xe.

In FIGS. 17 and 19, the horizontal axis represents formation positions R0 to R74 of 75 protrusion portions 80, and the formation positions R0 and R74 indicate the positions of the respective X direction outermost protrusion portions 80xe.

FIG. 20 is an explanatory diagram illustrating, in a table format, the N value of the protrusion region 8 and actual dimensions of the longitudinal direction interval DX and the longitudinal direction side edge distance EX that are used for each of the first to fourth experiment results.

As illustrated in FIG. 20, in a case of N=7, the longitudinal direction interval DX is 0.85 mm and the longitudinal direction side edge distance EX is 0.361 mm so that the ideal reference ST "0.425" is achieved. In a case of N=17, the longitudinal direction interval DX is 0.450 mm and the longitudinal direction side edge distance EX is 0.191 mm so that the ideal reference ST "0.425" is achieved. In a case of N=75, the longitudinal direction interval DX is 1.00 mm and the longitudinal direction side edge distance EX is 0.425 mm so that the ideal reference ST "0.425" is achieved.

Accordingly, FIGS. 16 and 18 illustrate upper and lower limit values when the ideal reference ST of 0.425 is assumed in measured value settings with the longitudinal direction interval DX of 0.85 mm and the longitudinal direction side edge distance EX of 0.361. In other words, FIGS. 16 and 18 each illustrate a case in which at least one of the longitudinal direction interval DX and the longitudinal direction side edge distance EX is shifted from the measured value for N=7 illustrated in FIG. 20 and becomes equal to the upper limit value or the lower limit value.

FIGS. 17 and 19 illustrate upper and lower limit values when the ideal reference ST of 0.425 is assumed in measured value settings with the longitudinal direction interval DX of 1.00 mm and the longitudinal direction side edge distance EX of 0.425. In other words, FIGS. 17 and 19 each illustrate a case in which at least one of the longitudinal direction interval DX and the longitudinal direction side edge distance EX is shifted from the measured value for N=75 illustrated in FIG. 20 and becomes equal to the upper limit value or the lower limit value.

The vertical axis is same as those of the first, second, and third experiment results illustrated in FIGS. 7 to 9, FIGS. 10 to 12, and FIGS. 13 to 15.

As illustrated with the load distribution line L10 in FIG. 16, when the extension ratio HR is equal to "0.510" as the upper limit value of the above-described first disposition condition with N=7, the load is "1.100" at the formation positions R0 and R6, which are most separated from the reference load, and thus the bonding property of the lead wire 12 to the solar battery thin film 11g can be excellently maintained at the ultrasonic bonding point 12p after the ultrasonic vibration processing.

As illustrated with the load distribution line L11 in FIG. 17, when the extension ratio HR is equal to "0.510" as the upper limit value of the above-described first disposition condition with N=75, the load is "1.100" at the formation positions R0 and R74, which are most separated from the reference load, and thus the bonding property of the lead wire 12 to the solar battery thin film 11g can be excellently maintained.

As illustrated with the load distribution line L12 in FIG. 18, when the extension ratio HR is equal to "0.349" as the lower limit value of the above-described first disposition condition with N=7, the load is "0.900" at the formation positions R0 and R6, which are most separated from the reference load, and thus the bonding property of the lead wire 12 to the solar battery thin film 11g can be excellently maintained.

As illustrated with the load distribution line L13 in FIG. 19, when the extension ratio HR is equal to "0.349" as the lower limit value of the above-described first disposition condition with N=75, the load is "0.900" at the formation positions R0 and R74, which are most separated from the reference load, and thus the bonding property of the lead wire 12 to the solar battery thin film 11g can be excellently maintained.

In this manner, when N protrusion portions 80 formed in the X direction as the longitudinal direction of the protrusion region 8 in the bonding tool 4 according to the present embodiment satisfy the above-described first disposition condition, variation in the peeling strength of the lead wire 12 can be suppressed in an allowable range irrespective of the magnitudes of the dimension absolute values of the longitudinal direction interval DX and the longitudinal direction side edge distance EX, and thus the bonding property of the lead wire 12 to the solar battery thin film 11g can be excellently maintained.

The protrusion region 8 in the bonding tool 4 according to the present embodiment satisfies the above-described second disposition condition in the case with EY/DY as the extension ratio HR. Thus, the fourth experiment result indicates that variation in the peeling strength of the lead wire 12 can be reliably suppressed in an allowable range in the Y direction irrespective of the magnitudes of the dimension absolute values of the transverse direction interval DY and the transverse direction side edge distance EY, and thus the bonding property of the lead wire 12 to the solar battery thin film 11g can be excellently maintained in a reliable manner.

(Others)

In the above-described embodiment, a substrate on which the lead wire 12 is formed is described to be the glass substrate 11, but may be a thin member made of, for example, ceramic, silicon, or epoxy in place of the glass substrate 11. The material of the conductive lead wire 12 is described to be aluminum, but may be another conductive material.

The bonding tool 4 and the press mechanisms 20 and 30 are described to be integrally formed as the apparatus 100 for ultrasonic bonding, but may be separated from each other as an ultrasonic vibration bonding apparatus. In this case, the bonding tool 4 and the press mechanisms 20 and 30 perform moving processing independently from each other. The cylinders 1, 21, and 31 are described to be electrical cylinders, but are not limited thereto.

The present invention is described above in detail, but the above description is exemplary in any aspect, and the present invention is not limited thereto. It is therefore understood that numerous modifications and variations can be devised without departing from the scope of the invention.

The invention claimed is:

1. A tool for ultrasonic bonding used for an ultrasonic vibration bonding apparatus configured to pressurize, from above, a bonding target material disposed on a surface of a substrate and apply ultrasonic vibration to said bonding target material to bond said bonding target material onto the surface of said substrate, wherein
a protrusion region that contacts with said bonding target material at application of ultrasonic vibration is provided at a tip portion of said tool for ultrasonic bonding,
said protrusion region includes a plurality of convex portions formed separately from each other, said plurality of convex portions each having a predetermined tip portion curvature more than "0" from a middle part of the protrusion region to a top part of the protrusion region, said plurality of convex portions being equally spaced at a first interval in a first direction, said first direction being a longitudinal direction of said protrusion region,
a first direction outermost convex portion positioned outermost in said first direction among said plurality of convex portions is disposed separately from an end part of said protrusion region in said first direction by a first direction end part distance, and
said plurality of convex portions are disposed so that a first disposition condition $\{0.349 \leq EX/DX \leq 0.510\}$ is satisfied where DX represents said first interval and EX represents said first direction end part distance.

2. The tool for ultrasonic bonding according to claim 1; wherein
said plurality of convex portions are formed in an N×M matrix of N ($\geq 2$) rows in a first direction and M ($\geq 2$) columns in a second direction orthogonal to said first direction on said protrusion region,
said plurality of convex portions are equally spaced at a second interval in said second direction,
a second direction outermost convex portion positioned outermost in said second direction among said plurality of convex portions is disposed separately from an end part of said protrusion region in said second direction by a second direction end part distance, and
said plurality of convex portions are disposed so that a second disposition condition $\{0.349 \leq EY/DY \leq 0.510\}$ is additionally satisfied where DY represents said second interval and EY represents said second direction end part distance.

3. The tool for ultrasonic bonding according to claim 2, wherein
said bonding target material includes a conductive lead wire disposed on said substrate in said first direction, a formation length direction of said lead wire being said first direction, a formation width direction being said second direction, and
the N×M matrix of said plurality of convex portions satisfies $\{N>M\}$.

4. An apparatus for ultrasonic bonding comprising:
the tool for ultrasonic bonding according to claim 3;
a substrate table on which said substrate is placed; and
an ultrasonic transfer unit configured to drive, while said lead wire is disposed on said substrate, said tool for ultrasonic bonding so that ultrasonic vibration is applied from said protrusion region to an application part on said lead wire.

5. The tool for ultrasonic bonding according to claim 1, wherein said plurality of convex portions each have a side surface part from a bottom part to the middle part that has a predetermined side surface part curvature that is different from the predetermined tip portion curvature.

6. The tool for ultrasonic bonding according to claim 5, wherein an absolute value of the predetermined side surface part curvature is greater than an absolute value of the predetermined tip portion curvature.

7. The tool for ultrasonic bonding according to claim 1, wherein said plurality of convex portions have planar surfaces therebetween.

\* \* \* \* \*